US012739151B2

(12) United States Patent
Chen et al.

(10) Patent No.: US 12,739,151 B2
(45) **Date of Patent: *Sep. 15, 2026**

(54) LINK CONFIGURATION METHOD AND CONTROLLER

(71) Applicant: HUAWEI TECHNOLOGIES CO., LTD., Shenzhen (CN)

(72) Inventors: Jiantao Chen, Shenzhen (CN); Changnian Xu, Nanjing (CN); Weiquan Feng, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/431,000

(22) Filed: Feb. 2, 2024

(65) Prior Publication Data

US 2024/0179027 A1 May 30, 2024

Related U.S. Application Data

(63) Continuation of application No. 17/030,839, filed on Sep. 24, 2020, now Pat. No. 11,924,004, which is a (Continued)

(30) Foreign Application Priority Data

Mar. 28, 2018 (CN) ......................... 201810265042.6

(51) Int. Cl.

*H04L 12/46* (2006.01)
*H04L 45/50* (2022.01)
*H04L 61/5061* (2022.01)

(52) U.S. Cl.

CPC ...... *H04L 12/4675* (2013.01); *H04L 12/4633* (2013.01); *H04L 45/50* (2013.01); *H04L 61/5061* (2022.05)

(58) Field of Classification Search

CPC . H04L 12/4675; H04L 12/4633; H04L 45/50; H04L 61/5061; H04L 41/0895;
(Continued)

(56) References Cited

U.S. PATENT DOCUMENTS 6,463,475 B1 10/2002 Calhoun
6,614,809 B1 9/2003 Verma et al.
(Continued)

FOREIGN PATENT DOCUMENTS

CN 101471879 A 7/2009
CN 102724117 A 10/2012
(Continued)

OTHER PUBLICATIONS

"Dynamic Multipoint VPN (DMVPN) Design Guide", Oct. 12, 2006(Oct. 12, 2006), XP055047762, Retrieved from the Internet, Total 104 Pages.

(Continued)

*Primary Examiner* — Dhairya A Patel
*Assistant Examiner* — Vinh Nguyen
(74) *Attorney, Agent, or Firm* — WOMBLE BOND DICKINSON (US) LLP

(57) ABSTRACT

This application disclose a link configuration method, to configure a DSVPN tunnel interface parameter. A controller obtains a first link profile for a first site and a second link profile for a second site from a link profile library, where the link profile library includes a plurality of link profiles. The controller obtains preconfigured global configuration information, where the global configuration information includes an address pool. The controller generates a first link configuration parameter of the first site and a second link configuration parameter of the second site based on the address pool, the first link profile, and the second link profile and according to a preset link configuration rule. The
(Continued)

controller sends the first link configuration parameter to the first site and sends the second link configuration parameter to the second site.

22 Claims, 6 Drawing Sheets

Related U.S. Application Data continuation of application No. PCT/CN2019/076607, filed on Mar. 1, 2019.

(58) Field of Classification Search
CPC ............. H04L 41/0886; H04L 41/0843; H04L 12/4641
See application file for complete search history.

(56) References Cited

U.S. PATENT DOCUMENTS 7,421,483 B1 * 9/2008 Kalra ...................... H04L 49/65 709/230
7,609,647 B2 10/2009 Turk et al.
7,673,048 B1 * 3/2010 O'Toole, Jr. ........ H04L 12/4633 709/227
7,675,912 B1 * 3/2010 Ward .................... H04L 45/026 370/392
7,751,405 B1 * 7/2010 Kompella ............... H04L 47/70 370/254
8,755,389 B1 * 6/2014 Poutievski ............ H04L 45/245 370/395.31
9,183,533 B2 * 11/2015 Serra ...................... G06Q 50/40
9,420,003 B2 8/2016 Bhalerao et al.
9,584,387 B1 * 2/2017 Cartlidge ................ H04L 43/50
9,686,188 B2 * 6/2017 Rebella ................... H04L 45/20
10,063,942 B2 * 8/2018 Donaghey ............... H04W 4/70
10,122,577 B1 * 11/2018 Rykowski ............... G06F 16/83
10,298,544 B2 * 5/2019 Duval ................. H04L 63/0272
10,382,401 B1 * 8/2019 Lee ....................... H04L 63/166
11,095,617 B2 8/2021 Jain et al.
2003/0009571 A1 1/2003 Bavadekar
2004/0006618 A1 * 1/2004 Kasai .................. H04L 12/4641 709/223
2004/0148430 A1 7/2004 Narayanan
2005/0235352 A1 10/2005 Staats et al.
2006/0029032 A1 2/2006 Allan et al.
2006/0242695 A1 10/2006 Nedeltchev et al.
2007/0104119 A1 * 5/2007 Sarkar ................. H04L 41/0843 370/254
2008/0271137 A1 10/2008 Sinn
2009/0296572 A1 12/2009 Xiong
2010/0142410 A1 * 6/2010 Huynh Van ......... H04L 12/4641 370/255
2010/0165877 A1 * 7/2010 Shukla .................... H04L 49/70 370/254
2010/0202772 A1 * 8/2010 Wei ......................... H04L 69/24 398/16
2011/0122880 A1 5/2011 Saito et al.
2012/0087356 A1 4/2012 Wentink
2012/0089834 A1 * 4/2012 Li ......................... H04W 24/02 713/168
2012/0113989 A1 * 5/2012 Akiyoshi ............ H04L 12/4633 370/409
2012/0124660 A1 5/2012 Wang
2012/0173694 A1 * 7/2012 Yan ..................... H04L 12/4641 709/223
2012/0246642 A1 * 9/2012 Pafumi ..................... G06F 8/63 718/1
2013/0058345 A1 3/2013 Kano
2013/0160076 A1 6/2013 Morita
2013/0212241 A1 8/2013 Kang et al.
2015/0249593 A1 * 9/2015 Alvarez ................ H04L 45/124 370/241
2015/0263865 A1 9/2015 Rangarajan et al.
2015/0281108 A1 * 10/2015 Furtak ................... H04L 45/125 370/392
2015/0341263 A1 11/2015 Du
2015/0347683 A1 * 12/2015 Ansari ................... G16H 10/60 726/7
2016/0197884 A1 * 7/2016 May .................... H04L 12/4641 726/1
2016/0277279 A1 * 9/2016 Lin ......................... H04L 45/02
2016/0308904 A1 * 10/2016 Yoon ................... H04L 63/0272
2016/0328252 A1 * 11/2016 Singh .................. G06F 9/45558
2016/0344630 A1 * 11/2016 Lee ..................... H04L 41/0668
2016/0353353 A1 * 12/2016 Sung ................... H04L 12/6418
2016/0380823 A1 12/2016 Shen et al.
2017/0004007 A1 * 1/2017 Kousaka ............... G06F 9/4843
2017/0041195 A1 * 2/2017 Wang ...................... H04L 45/64
2017/0093718 A1 * 3/2017 Lin ......................... H04L 47/34
2017/0099160 A1 4/2017 Mithyantha et al.
2017/0111454 A1 * 4/2017 Sung ....................... H04L 67/14
2017/0149777 A1 * 5/2017 Benson ................. H04L 67/146
2017/0161053 A1 * 6/2017 Hayakawa .......... G06F 9/44536
2017/0181203 A1 6/2017 Shanks et al.
2017/0207963 A1 * 7/2017 Mehta .................. H04L 41/083
2017/0295573 A1 * 10/2017 Klemmensen ....... H04R 25/554
2017/0302624 A1 10/2017 Persson et al.
2017/0310639 A1 10/2017 Milovanovic et al.
2018/0013798 A1 1/2018 Pallas
2018/0063847 A1 * 3/2018 Huang .................. H04W 28/16
2018/0077020 A1 3/2018 Li et al.
2018/0167307 A1 * 6/2018 Barry .................. H04L 45/7452
2018/0206284 A1 7/2018 Zhou et al.
2018/0219740 A1 * 8/2018 Kamath .............. H04L 41/0806
2018/0262365 A1 * 9/2018 Lee ..................... H04L 63/0272
2018/0332003 A1 * 11/2018 Deriso ................ H04L 63/0823
2018/0351800 A1 * 12/2018 Rykowski ............. H04L 67/303
2018/0367409 A1 12/2018 Zhang et al.
2019/0079821 A1 * 3/2019 Jeong .................... G06F 11/079
2019/0089557 A1 * 3/2019 Sung ................... H04L 12/4633
2019/0190746 A1 * 6/2019 Lee ..................... H04L 12/4641
2019/0238364 A1 8/2019 Boutros et al.
2020/0128430 A1 4/2020 Yi et al.
2020/0327797 A1 * 10/2020 Johan ..................... G08B 25/10
2025/0249599 A1 * 8/2025 Cristache ............... B25J 9/0009

FOREIGN PATENT DOCUMENTS

CN 102946610 A 2/2013
CN 103023707 A 4/2013
CN 107147509 A 9/2017
CN 107786353 A 3/2018
WO 2015007196 A1 1/2015
WO 2017139699 A1 8/2017

OTHER PUBLICATIONS

L. Dunbar et al., Seamless Interconnect Underlay to Cloud Overlay Problem Statement, Network Working Group, Mar. 2, 2018, 17 pages.

* cited by examiner 601
602
First obtaining unit
Second obtaining unit
Sending unit
Generating unit
604
603

LINK CONFIGURATION METHOD AND CONTROLLER

CROSS-REFERENCE TO RELATED APPLICATIONS

This application is a continuation of U.S. patent application Ser. No. 17/030,839 filed on Sep. 24, 2020, which is a continuation of International application No. PCT/CN2019/076607, filed on Mar. 1, 2019. The International Application claims priority to Chinese Patent Application No. 201810265042.6, filed on Mar. 28, 2018. All of the aforementioned patent applications are hereby incorporated by reference in their entireties.

TECHNICAL FIELD

This application relates to the communications field, and in particular, to a link configuration method and a controller.

BACKGROUND

A software-defined wide area network (SD-WAN) is a network technology for interconnection between enterprise spokes. The SD-WAN transmits, by monitoring quality of different wide area network links and according to a policy specified by a tenant (which refers to an enterprise using an SD-WAN solution), different network traffic by using links that have different quality, achieving an objective of reducing link usage costs of the tenant.

In the SD-WAN solution, spoke sites include network devices at locations of the enterprise spokes, and a hub site includes a network device at a location of the enterprise hub. Interconnection between the spoke sites and the hub site or interconnection between the spoke sites are implemented by creating dynamic smart virtual private network (DSVPN) tunnels. Access routers (AR) of the spokes and the hub register with a controller. The controller manages an AR, a VPN, and the like of each site. Before establishing the DSVPN tunnel, an administrator of the tenant needs to manually create a tunnel interface configuration parameter corresponding to the DSVPN on the controller, where the parameter includes a site type, a device corresponding to the site, a logical link type, a physical interface on which a logical link depends, a parameter related to a logical link address, an uplink bandwidth and/or a downlink bandwidth, or the like. The controller sends, based on information about a logical link of a site configured by the tenant, a link configuration parameter corresponding to the logical link to an AR of the site. The AR of the site can create a DSVPN tunnel based on the link configuration parameter after receiving the link configuration parameter.

In the prior art, to establish a DSVPN tunnel, the administrator of the tenant needs to manually enter a link configuration parameter. An automation degree is low, and a manual workload is large.

SUMMARY

Embodiments of this application provide a link configuration method, to automatically generate a link configuration parameter based on a link profile, and deliver the link configuration parameter to a site device to create a DSVPN.

A first aspect of the embodiments of this application provides a link configuration method, including the following operations.

A hub and spokes of an enterprise may communicate with each other by creating a DSVPN tunnel between sites by using SD-WAN technology. Spoke sites include network devices at locations of the spokes of the enterprise, and a hub site includes a network device at a location of an enterprise hub. A site AR registers with a controller, and a link profile library is preconfigured on the controller. The link profile library includes a plurality of link profiles, where each link profile includes information such as a gateway type, a link type, a link name, and a wide area network side physical port number of a gateway. First, the controller needs to obtain a first link profile and a second link profile that are respectively selected by a tenant from the link profile library for a first site and a second site. Moreover, the controller further needs to obtain global configuration information preconfigured in the controller, where the global configuration information includes an address pool of a link that may be configured to allocate an IP address to a tunnel interface. The controller generates a first link configuration parameter of the first site and a second link configuration parameter of the second site based on the first link profile, the second link profile, and the address pool and according to a preset link configuration rule. Finally, the controller sends the first link configuration parameter to the first site; and sends the second link configuration parameter to the second site.

According to the link configuration method provided in the embodiments of this application, the controller is preconfigured with the link profile, the global configuration information, and a link orchestration policy algorithm (namely, a link configuration rule). When a DSVPN tunnel interface configuration is generated, the tenant only needs to select a site type and a site profile based on current needs. The controller may automatically create, according to the link configuration rule, a tunnel configuration parameter required by a logical link. Compared with the prior art, the method provided in the embodiments of this application can improve a link configuration automation degree, reduce a manual workload, and reduce inconvenience to the tenant.

In one embodiment, the method further includes: obtaining, by the controller, a site type of the first site and a site type of the second site respectively; and obtaining, by the controller, a public IP address of a hub site if the site type of the first site or the site type of the second site is the hub site.

According to the link configuration method provided in the embodiments of this application, after obtaining that the site type of the first site or the site type of the second site is the hub site, the controller may obtain the public IP address configured by the tenant for the hub site, where the public IP address is used to indicate a gateway interface of an access router of a hub. The link configuration method provided in the embodiments of this application provides another case in which a link configuration parameter is generated, increasing solution implementation flexibility.

In one embodiment, the link profile further includes an uplink bandwidth and/or a downlink bandwidth.

According to the link configuration method provided in the embodiments of this application, the link profile may include an uplink bandwidth and/or a downlink bandwidth of a site gateway link, increasing solution implementation flexibility.

In one embodiment, the preset link configuration rule includes: link name matching and/or link type matching, where when the preset link configuration rule includes a plurality of rules, a priority of a former rule is higher than a priority of a latter rule.

The link configuration method provided in the embodiments of this application provides specific examples of the preset link configuration rule, increasing solution implementation feasibility.

In one embodiment, when the preset link configuration rule includes link name matching and link type matching, the generating a first link configuration parameter of the first site and a second link configuration parameter of the second site according to a preset link configuration rule includes: determining, by the controller, whether there are two links having a same link name in the first link profile and the second link profile, and configuring, by the controller, a first link in the first link profile and a second link in the second link profile as a logical link when the first link and the second link have a same link name, and allocating a link interface IP address of the logical link to each of the first site and the second site based on the address pool, to obtain the first link configuration parameter and the second link configuration parameter; or determining, by the controller if there are not two links having a same link name in the first link profile and the second link profile, whether there are two links having a same link type in the first link profile and the second link profile; and configuring, by the controller, a third link in the first link profile and a fourth link in the second link profile as a logical link when the third link and the fourth link have a same link type, and allocating a link interface IP address of the logical link to each of the first site and the second site based on the address pool, to obtain the first link configuration parameter and the second link configuration parameter.

The embodiments of this application provide a specific implementation of the preset link configuration rule. Links having a same link name may be determined preferably. If there are no links having a same link name, links having a same link type are determined. Link orchestration is performed according to this rule, which provides a specific implementation of link configuration, increasing solution realizability.

In one embodiment, where the configuring, by the controller, a third link and a fourth link as a logical link includes: obtaining, by the controller if there are a plurality of third links and/or a plurality of fourth links, a target third link and a target fourth link that have closest bandwidths, and configuring the target third link and the target fourth link as a logical link.

In the embodiments of this application, when there are a plurality of third links and/or a plurality of fourth links, the controller determines a specific link orchestration manner based on bandwidths, which provides another manner of the preset link configuration rule, and increasing solution implementation flexibility.

A second aspect of the embodiments of this application provides a controller. The controller has a function of implementing the link configuration method in the first aspect. The function may be implemented by using hardware, or may be implemented by hardware executing corresponding software. The hardware or software includes one or more modules corresponding to the foregoing function.

A third aspect of the embodiments of this application provides a controller. The controller includes: a processor and a memory. By running a software program stored in the memory, and invoking data stored in the memory, the processor performs the method in the implementations provided in the first aspect of the embodiments of this application.

A fourth aspect of the embodiments of this application provides a computer program product, including a computer program instruction. The computer program instruction may be loaded by using a processor to implement the method in the first aspect and the implementations in the first aspect.

A fifth aspect of the embodiments of this application provides a computer storage medium, configured to store a computer program instruction, which includes a program configured to perform the operation in the implementations provided in the first aspect of the embodiments of this application.

DESCRIPTION OF EMBODIMENTS

Figure 1:
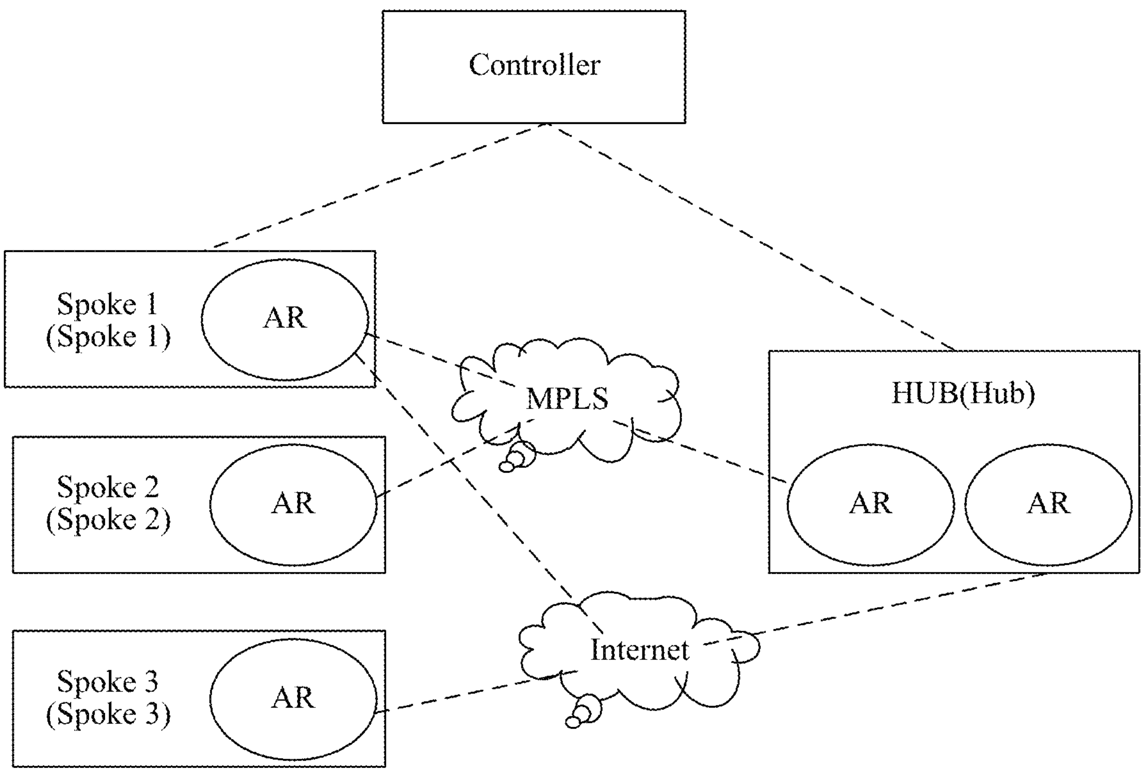
FIG. 1 is an architectural diagram of an SD-WAN solution.

FIG. 1 is an architectural diagram of a current SD-WAN solution.

An overlay (overlay) network is created between spoke sites (for example, Spoke 1, Spoke 2 and Spoke 3) and a hub site (for example, a HUB) of an enterprise. The hub site and the spoke sites and the spoke sites are interconnected by using DSVPN tunnels. Each DSVPN tunnel corresponds to a logical link, where the logical link is identified by the DSVPN tunnel interface. A type of the logical link corresponding to each DSVPN tunnel may be internet, multiprotocol label switching (MPLS), and long term evolution (LTE) and the like.

Interconnection between sites is implemented by ARs of the sites. ARs of the hub site and ARs of the spoke sites separately register with a controller, and the controller is responsible for delivering link configuration parameters to ARs on different sites.

Communication between two spoke sites is used as an example to describe the technical solution of this application. The controller sends a link configuration parameter to an AR of each spoke site (which is referred to as a spoke AR below). After receiving the corresponding link configuration parameter, each spoke AR sends a next hop resolution protocol request to an AR of a hub site (which is referred to as a HUB AR below), and informs the HUB AR of an outbound interface public IP address. After receiving the NHRP request, the HUB AR locally creates or updates an NHRP peer entry of the spoke AR. When data needs to be transmitted between the spoke sites, a source spoke AR looks a next hop of a target spoke AR up in a routing table. If a public IP address corresponding to the next hop cannot be found in the NHRP peer entry of the source spoke AR, the source spoke AR sends an NHRP address resolution request to the HUB AR, to obtain a public IP address of the target spoke AR. Subsequently, a VPN tunnel is dynamically created between the two spoke ARs by using a multipoint generic routing encapsulation (mGRE) interface, so that data can be directly transmitted between the two spoke sites.

Figure 2:
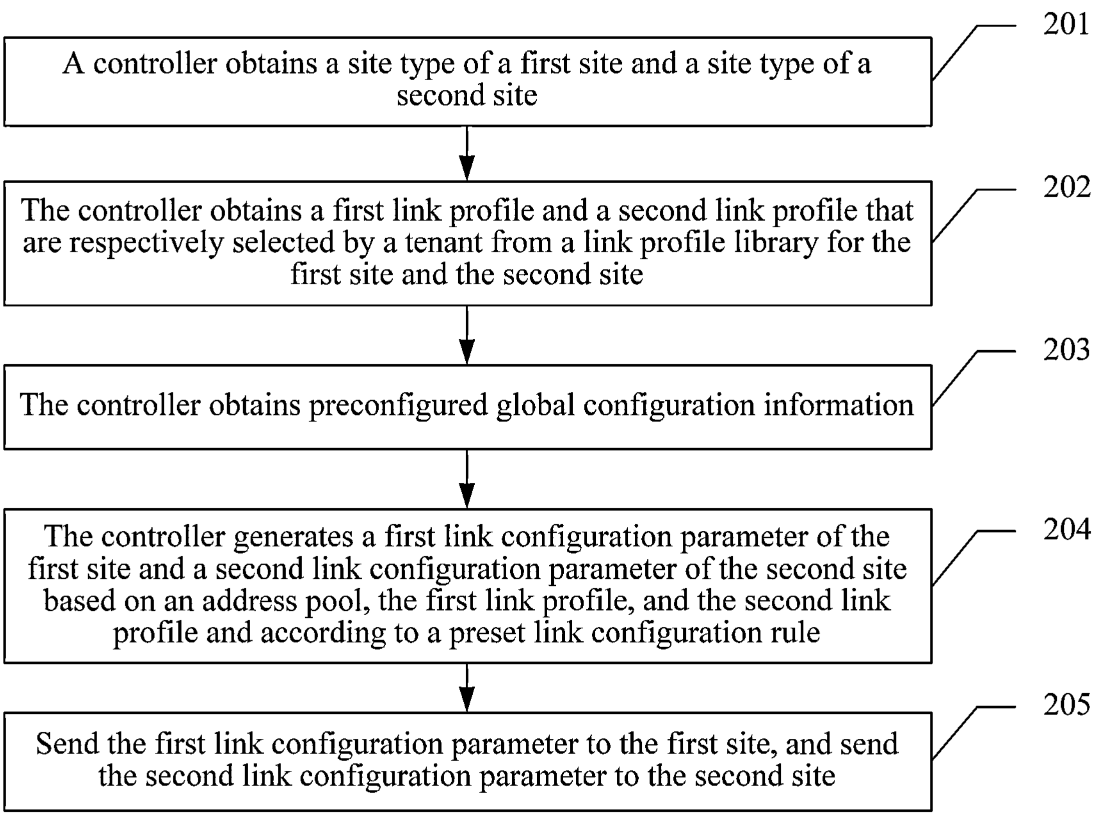
FIG. 2 is a schematic diagram of an embodiment of a link configuration method according to embodiments of this application.

FIG. 2 is a schematic flowchart of a link configuration method according to an embodiment of this application.

201. A controller obtains a site type of a first site and a site type of a second site.

A spoke site includes a network device at a location of an enterprise spoke, and a hub site includes a network device at a location of an enterprise hub. ARs of the spoke site and the hub site separately register with the controller, and the controller manages an AR and a VPN of each site. An overlay network usually includes one hub site and at least one spoke site. A site type may be a hub site or a spoke site. The site type of the first site and the site type of the second site may be one hub site and one spoke site, or two spoke sites. The site type of the first site and the site type of the second site are not specifically limited herein. The controller respectively obtains the site type of the first site and the site type of the second site based on entering or selection of a tenant.

Operation 201 is an optional operation of this application.

Operation 202. The controller obtains a first link profile and a second link profile that are respectively selected by a tenant from a link profile library for the first site and the second site.

The link profile library is preconfigured in the controller, and includes a plurality of link profiles. A specific quantity of the link profiles is not limited herein. The link profile is a topology diagram profile that is of a wide area network side of a site and that is preconfigured in the controller, and includes a gateway type, a link type, a link name, and a wide area network side physical port number of a gateway. The gateway type includes a single gateway or dual gateways. The link type identifies a link type provided by an internet service provider (ISP). The link type may be internet, MPLS, LTE, or the like. The link name may be customized, for example, includes a link type and an ISP. The ISP may be, for example, the China mobile communications corporation (CMCC), so that the link name may be, for example, Internet-CMCC or MPLS-CMCC. The link name may be in another form. In this application, one site includes at least one AR. The wide area network side physical port number of the gateway is physical port information bound to a logical link. Moreover, the link profile may further include an uplink bandwidth and/or a downlink bandwidth and a public IP address. The link profile may include a specific uplink bandwidth and/or downlink bandwidth, for example, 20 M or 100 M, or a default uplink bandwidth and/or downlink bandwidth may be directly used. A specific form of the uplink bandwidth and/or the downlink bandwidth is not limited herein. The public IP address is used to indicate a gateway interface of an access router of a hub. This application needs to configure a public IP address for the hub site, and does not need to configure a public IP address for the spoke site. The public IP address may be preconfigured in the link profile, or may be entered by an administrator of the tenant after the controller obtains the link profile of the hub site. A manner of obtaining the public IP address of the hub site is not specifically limited herein.

The controller obtains the first link profile and the second link profile that are respectively selected by the tenant for the first site and the second site. Generally, an access router serves as a gateway of a site to communicate with an access router of another site. The tenant selects a corresponding profile according to a gateway type and a link type of a site, for example, a single_gateway_internet_link profile or a dual_gateways_mixed_links profile.

Operation 203. The controller obtains preconfigured global configuration information.

The preconfigured global configuration information includes an address pool of the logical link. When configuring a link configuration parameter, the controller respectively allocates an IP address to an AR of the first site and an IP address to an AR of the second site based on the address pool.

Operation 204. The controller generates a first link configuration parameter of the first site and a second link configuration parameter of the second site based on an address pool, the first link profile, and the second link profile and according to a preset link configuration rule.

The controller obtains the first link profile of the first site and the second link profile of the second site. A link profile of one site includes information about at least one link. The controller can configure links between different sites as logical links according to the preset link configuration rule. The preset link configuration rule may include link name matching and/or link type matching. The link name matching means that two links having a same link name in two different link profiles are configured as a logical link; the link type matching means that two links having a same link type in two different link profiles are configured as a logical link. The preset link configuration rule may further include other rules. When the preset link configuration rule includes a plurality of rules, a priority of a former rule is higher than a priority of a latter rule.

Using an example in which the preset rule includes the link name matching and the link type matching, the controller determines whether there are two links having a same link name in the first link profile and the second link profile.

The controller configures a first link in the first link profile and a second link in the second link profile as a logical link when the first link and the second link have a same link name, and allocates a link interface IP address of the logical link to each of the first site and the second site based on the address pool, to obtain the first link configuration parameter and the second link configuration parameter.

The controller determines, if there are not two links having a same link name in the first link profile and the second link profile, whether there are two links having a same link type in the first link profile and the second link profile.

The controller configures a third link in the first link profile and a fourth link in the second link profile as a logical link when the third link and the fourth link have a same link type, and allocates a link interface IP address of the logical link to each of the first site and the second site based on the address pool, to obtain the first link configuration parameter and the second link configuration parameter.

It may be understood that the rule described above is only an example of the preconfigured rule. Specific content of the preconfigured rule is not limited herein.

Operation 205. Send the first link configuration parameter to the first site, and send the second link configuration parameter to the second site.

The controller sends the first link configuration parameter to the first site, and sends the second link configuration parameter to the second site. In an implementation, a delivering manner may be that the controller respectively generates NETCONF packets for the first site and the second site based on the link configuration parameter, and then respectively sends the corresponding NETCONF packets to the first site and the second site.

According to the link configuration method provided in the embodiments of this application, the controller is preconfigured with the link profile, the global configuration information and the preset link configuration rule. When a DSVPN tunnel interface configuration is generated, the tenant only needs to select a site type and a site profile based on current needs. The controller can automatically configure, according to the link configuration rule, a tunnel configuration parameter required to create the logical link. Compared with the prior art, the method provided in the embodiments of this application can improve a link configuration automation degree, reduce a manual workload, and reduce inconvenience to the tenant.

Figure 3:
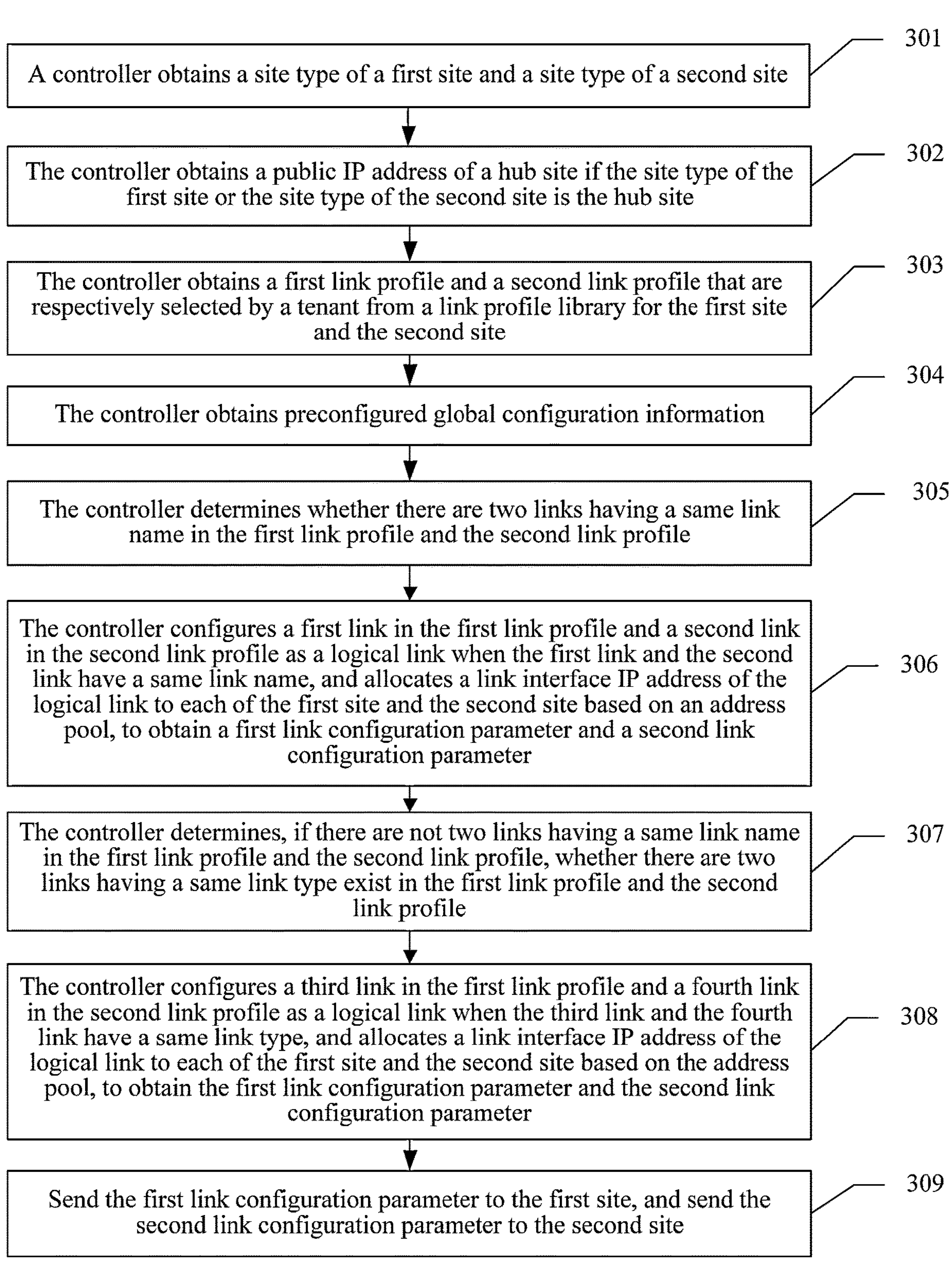
FIG. 3 is a schematic diagram of another embodiment of a link configuration method according to the embodiments of this application.

FIG. 3 is a schematic diagram of another embodiment of a link configuration method according to an embodiment of this application.

Operation 301. A controller obtains a site type of a first site and a site type of a second site.

An overlay network usually includes one hub site and at least one spoke site. A combination of the site type of the first site and the site type of the second site may be one hub site and one spoke site, or two spoke sites. The site type of the first site and the site type of the second site are not specifically limited herein. The controller respectively obtains the site type of the first site and the site type of the second site based on entering or selection of a tenant.

Further, when the overlay network required to be established includes a plurality of spoke sites, the controller may obtain site types of a plurality of sites. For example, the controller obtains four sites selected by the tenant and respectively selects the site types as a hub, a spoke, a spoke and a spoke. To be specific, the overlay network includes one hub site (HUB) and three spoke sites (Spoke 1, Spoke 2, and Spoke 3).

Operation 301 is an optional operation of this application.

Operation 302. The controller obtains a public IP address of a hub site if the site type of the first site or the site type of the second site is the hub site.

The public IP address is used to indicate a gateway interface of an access router of a hub. This application needs to configure the public IP address for the hub site, and does not need to configure the public IP address for the spoke site. The public IP address may be preconfigured in a link profile, or may be entered by an administrator of the tenant after the controller obtains the link profile of the hub site. A manner of obtaining the public IP address of the hub site is not specifically limited herein.

It should be noted that operation 302 may be performed before any operation of operation 303 to operation 306. A specific performing sequence is not limited herein.

Operation 303. The controller obtains a first link profile and a second link profile that are respectively selected by the tenant from a link profile library for the first site and the second site.

The link profile library is preconfigured in the controller, and includes a plurality of link profiles. A specific quantity of the link profiles is not limited herein. The link profile is a topology diagram profile that is of a wide area network side of a site and that is preconfigured in the controller, and includes a gateway type, a link type, a link name, and a wide area network side physical port number of a gateway. The gateway type includes a single gateway or dual gateways. The link type identifies a link type provided by an internet service provider (ISP). The link type may be internet, MPLS, LTE, or the like. The link name may be customized, for example, includes a link type and an ISP. The ISP may be, for example, the China mobile communications corporation (CMCC), so that the link name may be, for example, Internet-CMCC or MPLS-CMCC. The link name may be in another form. In this application, one site includes at least one AR. The wide area network side physical port number of the gateway is physical port information bound to the logical link. Moreover, the link profile may further include an uplink bandwidth and/or a downlink bandwidth. The link profile may include a specific uplink bandwidth and/or downlink bandwidth, for example, 20 M and 100 M, or a default uplink bandwidth and/or downlink bandwidth may be directly used. A specific value of the uplink bandwidth and/or the downlink bandwidth is not limited herein.

In addition, the link profile may further include internet protocol security (IPsec) encryption information and other description information. Attachment information in the link profile is not specifically limited herein.

The link profile library may be in a form of a list, for example:

| Option | Link name | Gateway type | Physical port number | Link type |
|---|---|---|---|---|
| □ | Internet-CMCC | Single gateway | GE0/0/1 | INET |
| □ | MPLS-CMCC | Single gateway | GE0/0/2 | MPLS |
| □ | LTE-CTCC | Single gateway | GE0/0/1 | ESCAPE |

Figure 4:
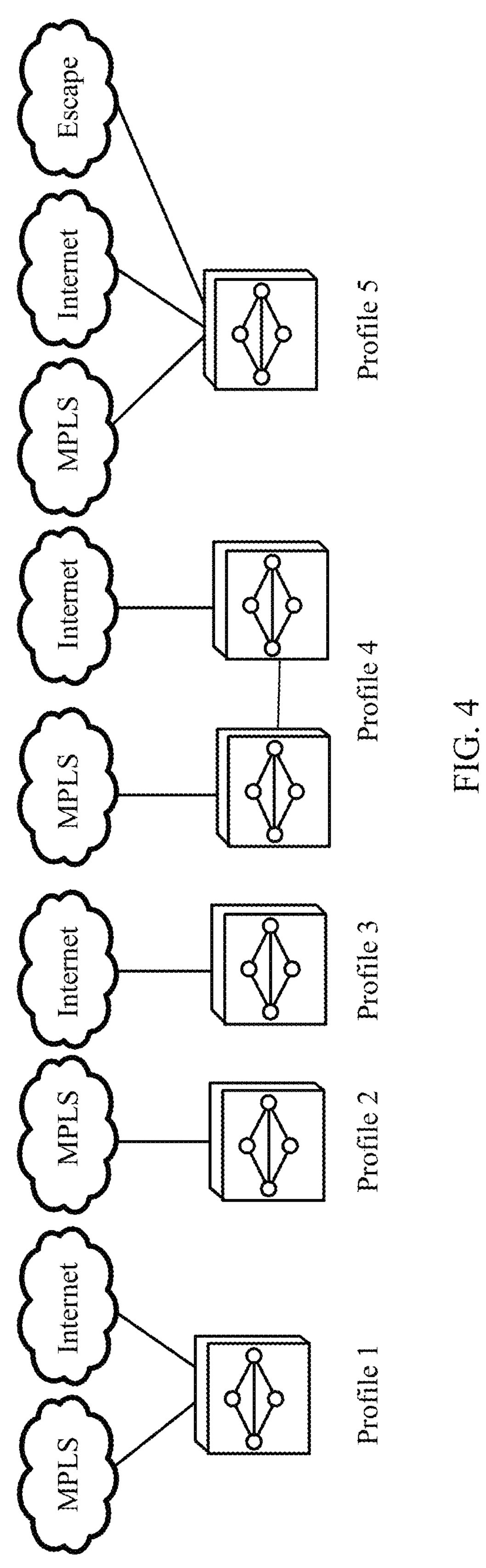
FIG. 4 is a schematic diagram of topology diagram profiles of a wide area network side of a site according to an embodiment of this application.

The link profile may further present, in a straight way, the gateway type and the link type of the site in a form of the topology diagram of the wide area network side of the site. Referring to FIG. 4, profile 1: single_gateway_mixed_links; profile 2: single_gateway_MPLS_link; profile 3: single_gateway_internet_link; profile 4: dual_gateways_mixed_links; and profile 5: single_gateway_dual_internet_links.

It may be understood that the link profile may be in a plurality of forms, and this is not specifically limited herein.

Generally, an access router of a site acts as a gateway of the site to communicate with an access router of another site. The tenant selects a matching profile based on a gateway type and a link status of the site.

Figures 5, 6:
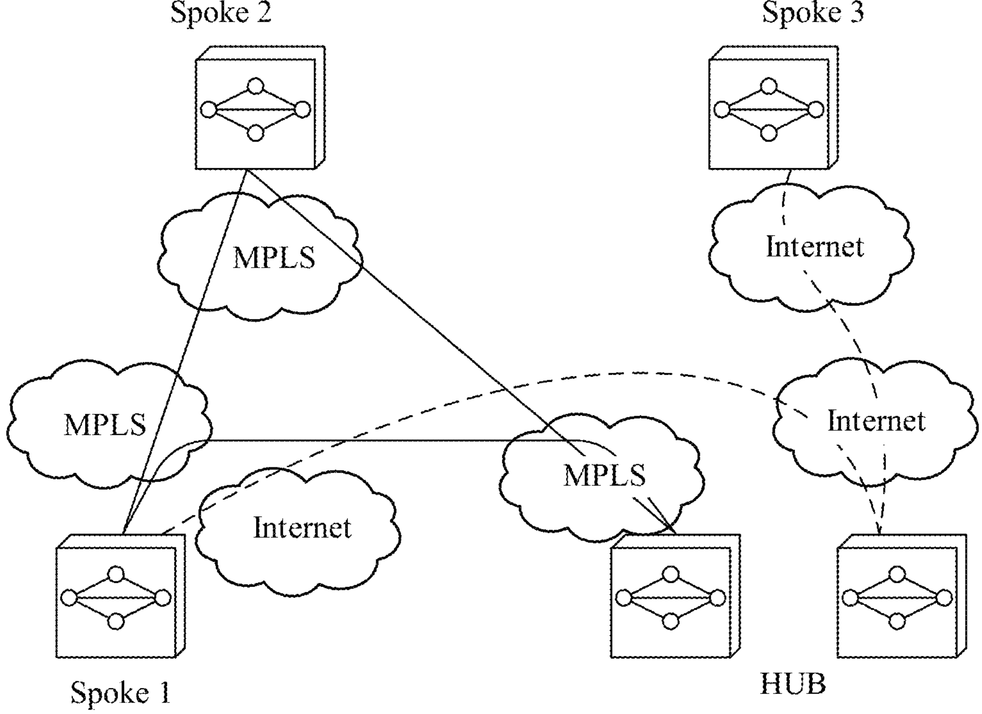
FIG. 5 is a network architectural diagram of a hub and spokes of an enterprise according to an embodiment of this application.
FIG. 6 is a schematic diagram of an embodiment of a controller according to the embodiments of this application.

Examples are used for description below. FIG. 5 is a network architectural diagram of a hub and spokes of an enterprise. When the network architecture shown in FIG. 5 is established, a link profile corresponding to each site is required to be selected for each site first. Link profiles of a HUB site, a Spoke 1 site, a Spoke 2 site and a Spoke 3 shown in the figure may be:

A link profile of the HUB site is dual_gateways_mixed_dual_links:

| Option | Gateway type | Link name | Gateway device | Physical port | Link type |
|---|---|---|---|---|---|
| √ | Dual gateways | Internet-CMCC | Device 1 | GE0/0/1 | Internet |
| | | MPLS-CMCC | Device 2 | GE0/0/2 | MPLS |

A site whose gateway type is dual gateways usually distinguishes two gateways based on a gateway device item.

A link profile of the Spoke 1 site is single_gateway_mixed_link:

| Option | Gateway type | Link name | Gateway device | Physical port | Link type |
|---|---|---|---|---|---|
| √ | Dual gateways | Internet-CMCC | Device 1 | GE0/0/1 | Internet |
| | | MPLS-CMCC | Device 2 | GE0/0/2 | MPLS |

The link profile of the Spoke 2 site is single_gateway_MPLS_link:

| Option | Link name | Gateway type | Physical port | Link type |
|---|---|---|---|---|
| √ | MPLS-CMCC | Single gateway | GE0/0/1 | MPLS |

The link profile of the Spoke 3 site is single_gateway_internet_link:

| Option | Link name | Gateway type | Physical port | Link type |
|---|---|---|---|---|
| √ | Internet-TeleCom | Single gateway | GE0/0/1 | Internet |

Operation 304. The controller obtains preconfigured global configuration information.

The preconfigured global configuration information includes an address pool of the logical link, and the address pool obtained by the controller, for example, may be 172.16.1.0/16. Specific IP information of the address pool is not limited herein. The global configuration information may be used to respectively allocate IP addresses of site access routers to the first site and the second site when the controller generates link configuration information.

It should be noted that operation 304 may be performed before any operation of operation 301 to operation 306. A specific performing sequence is not limited herein.

Operation 305. The controller determines whether there are two links having a same link name in the first link profile and the second link profile.

A link profile includes information of at least one link. After obtaining link profile information of the first site and the second site, the controller may orchestrate links between different sites according to a preset link configuration rule.

Using an example in which the link name includes the link type and internet service provider ISP information, the controller may determine whether there is a first link and a second link having a same link name exist. The first link is link information in the first link profile and the second link is link information in the second link profile.

Referring to the example of the link profiles of the sites that are provided in FIG. 5 and operation 303, the gateway types and the link types of the hub site and the three spoke sites in FIG. 5 are used as an example for description: The controller determines whether there are links having a same link name in link profiles respectively determined by the tenant for the HUB site, the Spoke 1 site, the Spoke 2 site and the Spoke 3 site. From the link profiles of the sites provided in operation 303, it can be learned that there is a link whose link name is "MPLS-CMCC" in each of the link profile of the HUB site, the link profile of the Spoke 1 site, and the link profile of the Spoke 2 site. Therefore, operation 306 is performed.

Operation 306. The controller configures the first link in the first link profile and the second link in the second link profile as a logical link when the first link and the second link have a same link name, and allocates a link interface IP address of the logical link to each of the first site and the second site based on the address pool, to obtain the first link configuration parameter and the second link configuration parameter.

If there is the first link and the second link having the same link name, the controller configures the two links, to be specific, the first link and the second link, as a logical link. Moreover, the controller respectively allocates IP addresses to gateway interfaces of two ends of the link based on the address pool obtained in operation 302, to finally obtain the first link configuration parameter and the second link configuration parameter.

Examples are used for description below. Referring to the example of the link profiles of the sites that are provided in FIG. 5 and operation 303, the controller obtains link profiles of the HUB site and the Spoke 1 site, and the controller can find that there is a link whose link name is "MPLS-CMCC" in the link profiles of each of the HUB site and the Spoke 1 site. The controller configures the "MPLS-CMCC" link in the link profiles of the HUB site and the "MPLS-CMCC" link in the link profiles of the Spoke 1 site as a logical link whose link type is "MPLS"; respectively configures, based on the address pool, link interface IP addresses for end points of the "MPLS" logical link, to be specific, an AR device 2 of the HUB site and an AR device 2 of the Spoke 1 site, to obtain a first link configuration parameter (including a physical port number and a link interface IP address of a HUB AR) generated for the HUB site and a second link configuration parameter (including a physical port number, a link interface IP address of a Spoke 1 AR, an IP address of the AR device 1 that is directed to the HUB site, and a public IP address directed to the HUB site) generated for the Spoke 1 site; generates a first NETCONF packet based on the first link configuration parameter, and sends the first NETCONF packet to the HUB AR; and generates a second NETCONF packet based on the second link configuration parameter, and sends the second NETCONF packet to the Spoke 1 AR.

The controller finds that there is a link whose link name is "Internet-CMCC" in the link profiles of each of the HUB site and the Spoke 1 site; configures the "Internet-CMCC" link in the link profiles of the HUB site and the "Internet-CMCC" link in the link profiles of the Spoke 1 site as a logical link whose link type is "Internet"; respectively configures, based on the address pool, link interface IP addresses for end points of the "Internet" logical link, to be specific, an AR device 1 of the HUB site and an AR device 1 of the Spoke 1 site, to obtain a first link configuration parameter (including a physical port number and a link interface IP address of the HUB AR) generated for the HUB site and a second link configuration parameter (including a physical port number, a link interface IP address of the Spoke 1 AR, an IP address of the AR device 1 that is directed to the HUB site, and a public IP address directed to the HUB site) generated for the Spoke 1 site; generates a first NETCONF packet based on the first link configuration parameter and sends the first NETCONF packet to the HUB AR; and generates a second NETCONF packet based on the second link configuration parameter and sends the second NETCONF packet to the Spoke 1 AR.

Similarly, the controller finds that there is a link whose link name is "MPLS-CMCC" in the link profiles of the HUB site, and there is a link whose link name is "MPLS-CMCC" in the link profile of the Spoke 2 site. The controller configures the "MPLS-CMCC" link in the link profiles of the HUB site and the "MPLS-CMCC" link in the link profile of the Spoke 2 site as a logical link whose link type is "MPLS". Because one "MPLS" logical link has been configured between the HUB site and the Spoke 1 site, and a link parameter has been configured for the HUB site previously, the controller may configure, based on the address pool, a link interface IP address only for an AR of the Spoke 2 site at the other end of the "MPLS" logical link, to obtain a second link configuration parameter (including a physical port number, a link interface IP address of the Spoke 2 AR, an IP address of the AR device 2 that is directed to the HUB site and a public IP address directed to the HUB site) of the Spoke 2 site, and generate a second NETCONF packet based on the second link configuration parameter and send the second NETCONF packet to the Spoke 2 AR.

Operation 307. The controller determines, if there are not two links having a same link name in the first link profile and the second link profile, whether there are two links that have a same link type in the first link profile and the second link profile.

The controller determines, if there are not two links having a same link name in the first link profile and the second link profile, whether there are two links that have a same link type, that is, a third link and a fourth link, in the first link profile and the second link profile. The third link is a link in the first link profile, and the fourth link is a link in the second link profile.

Examples are used for description below. Referring to the example of the link profiles of the sites that are provided in FIG. 5 and operation 303, because there are no links having a same link name in the link profiles of the HUB site and the Spoke 3 site, the controller determines whether there are links having a same link type in the link profiles of the HUB site and the Spoke 3 site.

Operation 308. The controller configures the third link in the first link profile and the fourth link in the second link profile as a logical link when the third link and the fourth link have a same link type, and allocates a link interface IP address of the logical link to each of the first site and the second site based on the address pool, to obtain the first link configuration parameter and the second link configuration parameter.

The controller configures the third link in the first link profile and the fourth link in the second link profile as a logical link when the third link and the fourth link have a same link type, and allocates, based on the address pool obtained in operation 302, the link interface IP address, to obtain the first link configuration parameter and the second link configuration parameter and generates a NETCONF packet based on the link configuration parameters.

Examples are used for description below. Referring to the example of the link profiles of the sites that are provided in FIG. 5 and operation 303, there are links both having the same link type "Internet" in the link profiles of the HUB site and the Spoke 3 site. The controller obtains link profiles of the HUB site and the Spoke 3 site, and controller finds that there is a link whose link type is "Internet" in the link profiles of the HUB site, and there is a link whose link type is "Internet" in the link profile of the Spoke 3 site. The controller configures the "Internet" link in the link profiles of the HUB site and the "Internet" link in the link profile of the Spoke 3 site as an "Internet" logical link; respectively configures link interface IP addresses for end points of the "Internet" logical link, to be specific, the AR device 1 of the HUB site and an AR of the Spoke 3 site based on the address pool, to obtain the first link configuration parameter (including a link interface IP address of the AR device 1 of the HUB) and the second link configuration parameter (including a link interface IP address of the Spoke 3 AR); generates a first NETCONF packet based on the first link configuration parameter and sends the first NETCONF packet to the AR device 1 of the HUB; and generates a second NETCONF packet based on the second link configuration parameter and sends the second NETCONF packet to the Spoke 3 AR. It should be noted that if the logical link whose link type is "Internet" has been configured between the AR device 1 of the HUB site and the AR of the Spoke 1 site previously, in this operation, the controller may configure the link interface IP address and the first link configuration parameter for the HUB site no longer.

It should be noted that when a plurality of links having a same link type between two sites, for example, when the link profile of the Spoke 3 is dual_internet_links, the controller may obtain uplink bandwidth and/or downlink bandwidth information of the links from the link profile, select one link whose uplink bandwidth and/or downlink bandwidth value is closest to the uplink bandwidth and/or downlink bandwidth value of the internet link of the HUB site, and configure the selected link and the internet link of the HUB site as a logical internet link.

Operation 309. Send the first link configuration parameter to the first site, and send the second link configuration parameter to the second site.

The controller sends the first link configuration parameter to the first site, and sends the second link configuration parameter to the second site. In an implementation, a delivering manner may be that the controller generates a first NETCONF packet based on the first link configuration parameter, generates a second NETCONF packet based on the second link configuration parameter, and then respectively sends the first NETCONF packet and the second NETCONF packet to the first site and the second site.

Examples are used for description below. Referring to the example of the link profiles of the sites that are provided in FIG. 5 and operation 303, configurations generated by the "MPLS" link created between the HUB site and the Spoke 1 site for of the sites are as follows:

The HUB site side:

interface Tunnel0/0/0
ip address 172.16.1.1 255.255.255.0
tunnel-protocol gre p2mp
source GigabitEthernet0/0/2
nhrp redirect
nhrp entry multicast dynamic "Interface Tunnel0/0/0" represents an interface of one end of a link (to be specific, the AR device 2 of the HUB site). "Ip address 172.16.1.1 255.255.255.0" is an IP address allocated by the controller from the address pool, and is used to indicate an interface of the link on the HUB site side. "Tunnel-protocol gre p2mp" represents a GRE tunnel mode in P2MP (point-to-multipoint). "Source GigabitEthernet0/0/2" represents a Gigabit Ethernet interface number. "Nhrp redirect" represents NHRP redirection, and is used for the hub site. "Nhrp entry multicast dynamic" represents that a spoke configured with dynamic register joins an NHRP multicast member table.

The Spoke 1 site side:

interface Tunnel0/0/0
ip address 172.16.1.2 255.255.255.0
tunnel-protocol gre p2mp
source GigabitEthernet0/0/2
nhrp shortcut
nhrp entry 172.16.1.1 202.1.1.10 register "Nhrp entry 172.16.1.1 202.1.1.10 register" is a Tunnel IP and public IP address directed to a hub. When the spoke 1 site accesses the public IP, an NHRP register request may be sent to the public IP of the hub. "Nhrp shortcut" represents an aggregated route scheme in which a deployed spoke is only stored in the hub, so that a next hop of a route of a subnet from a source spoke to a target spoke is a tunnel address of the hub, that is, a shortcut scenario. Other items are similar to a configuration parameter of the hub. Details are not described herein again.

An "Internet" link is further created between the HUB site and the Spoke 1 site, and configurations generated for two ends of the link are as follows.

The HUB site side:

interface Tunnel0/0/0
ip address 172.16.1.3 255.255.255.0
tunnel-protocol gre p2mp
source GigabitEthernet0/0/1
nhrp redirect
nhrp entry multicast dynamic The Spoke 1 site side:

interface Tunnel0/0/1
ip address 172.16.1.4 255.255.255.0
tunnel-protocol gre p2mp
source GigabitEthernet0/0/1
nhrp shortcut
nhrp entry 172.16.1.3 202.1.1.11 register Because the Spoke 1 site side of the single gateway is configured with parameters of two logical links with different link types, which can be distinguished by using physical interface numbers. Specific meanings of other parameters are not described herein again.

The "MPLS" link is also created between the HUB site and the Spoke 2 site. Because the link configuration has been generated when the "MPLS" link is established between the HUB site and the Spoke 1 site, the controller generates a link configuration of the link only for the Spoke 2 site:

The Spoke 2 site side:

interface Tunnel0/0/0
ip address 172.16.1.5 255.255.255.0
tunnel-protocol gre p2mp
source GigabitEthernet0/0/1
nhrp shortcut
nhrp entry 172.16.1.1 202.1.1.10 register Specific meanings of the parameters are not described herein again.

The "Internet" link is created between the HUB site and the Spoke 3 site. Because the link configuration has been generated when the "Internet" link is established between the HUB site and the Spoke 1 site, a link configuration of the link is generated on the Spoke 3 side:

interface Tunnel0/0/0
ip address 172.16.1.6 255.255.255.0
tunnel-protocol gre p2mp
source GigabitEthernet0/0/1
nhrp shortcut
nhrp entry 172.16.1.3 202.1.1.11 register Meanings of the link configuration parameters are not described herein again.

Each site obtains the configuration parameter based on the packet delivered by the controller, and a VPN tunnel is created in a dynamic manner, so that data can be transmitted between sites.

According to the link configuration method provided in the embodiments of this application, the controller is preconfigured with the link profile, the global configuration information, and the preset link configuration rule. When generating the configuration of the DSVPN tunnel interface, the tenant only needs to select a site type and a site profile based on current needs. The controller can automatically create a tunnel configuration parameter required by the logical link according to a profile matching rule, and can also preconfigure different link orchestration policies according to an actual condition, to orchestrate links having a same link type and a same ISP, or orchestrate links having a same link type and close bandwidths. The method provided in the embodiments of this application can improve a link configuration automation degree, reduce a manual workload, and reduce inconvenience to the tenant.

The foregoing embodiments describe the link configuration method in this application, and a controller that implements the link configuration method is described below. FIG. 6 is a schematic diagram of an embodiment of a controller according to this application.

The controller includes:

a first obtaining unit 601, configured to obtain a first link profile and a second link profile that are respectively selected by a tenant from a link profile library for a first site and a second site, where the link profile library includes a plurality of link profiles, and each of the plurality of link profiles includes a gateway type, a link type, a link name, and a wide area network side physical port number of a gateway;

a second obtaining unit 602, configured to obtain preconfigured global configuration information, where the global configuration information includes an address pool of a link;

a generating unit 603, configured to generate, a first link configuration parameter of the first site and a second link configuration parameter of the second site based on the address pool, the first link profile, and the second link profile and according to a preset link configuration rule, where in an implementation, the generating unit 603 is specifically configured to:

determine whether there are two links having a same link name in the first link profile and the second link profile, and configure a first link in the first link profile and a second link in the second link profile as a logical link when the first link and the second link have a same link name, and allocate a link interface IP address of the logical link to each of the first site and the second site based on the address pool, to obtain the first link configuration parameter and the second link configuration parameter; or determine, if there are not two links having a same link name in the first link profile and the second link profile, whether there are two links having a same link type in the first link profile and the second link profile; and configure a third link in the first link profile and a fourth link in the second link profile as a logical link when the third link and the fourth link have a same link type, and allocate a link interface IP address of the logical link to each of the first site and the second site based on the address pool, to obtain the first link configuration parameter and the second link configuration parameter; and a sending unit 604, configured to send the first link configuration parameter to the first site, and send the second link configuration parameter to the second site.

The first obtaining unit 601 is further configured to:

obtain a site type of the first site and a site type of the second site respectively; and obtain a public IP address of a hub site if the site type of the first site or the site type of the second site is the hub site.

The generating unit 603 is further configured to:

obtain, if there are a plurality of third links and/or a plurality of fourth links, a target third link and a target fourth link that have closest bandwidths, and configure the target third link and the target fourth link as a logical link.

The process of implementing the link configuration method by the controller provided in this embodiment of this application is similar to the method procedure described in the embodiment shown in FIG. 2 or FIG. 3. Details are not described herein again.

In addition, function units in the embodiments of this application may be integrated into one processing unit, or each of the units may exist alone physically, or two or more units are integrated into one unit. The integrated unit can be implemented in a form of hardware, or can be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

In the several embodiments provided in this application, it should be understood that the disclosed system, apparatus, and method may be implemented in other manners. For example, the described apparatus embodiments are merely examples. For example, division into the units is merely logical function division and may be another division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

Figure 7:
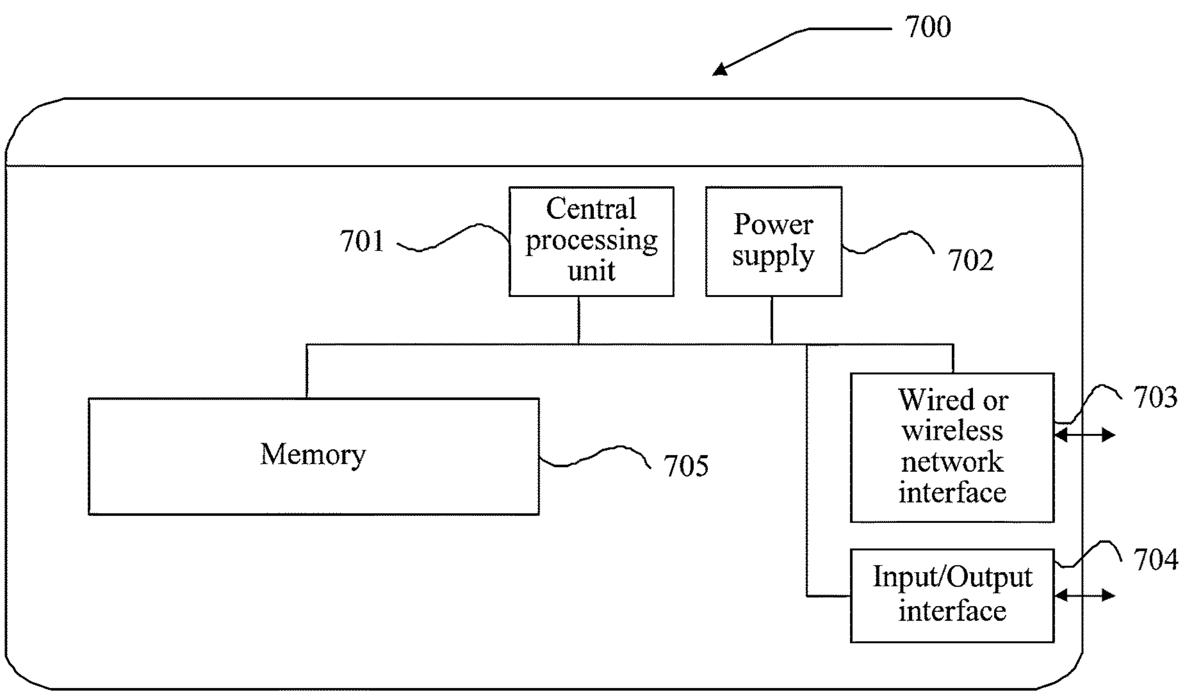
FIG. 7 is a schematic diagram of another embodiment of a controller according to the embodiments of this application.

Based on the foregoing description, the following is another embodiment of a controller in the embodiments of this application. FIG. 7 is a schematic diagram of the another embodiment of the controller according to the embodiments of this application. The device 700 may be a controller or a part of the controller.

The controller 700 may vary greatly due to different configurations or performance, and may include one or more central processing units (CPU) 701 (for example, one or more processors of other types) and a memory 705. The memory 705 stores one or more application programs or data. The memory 705 may be a volatile memory or a persistent memory. A program stored in the memory 705 may include one or more modules, and each module may include a series of instructions and operations for the controller. Further, the central processing unit 701 may be configured to communicate with the memory 705, and execute, on the controller 700, a series of instructions and operations in the memory 705.

The controller 700 may further include one or more power supplies 702, one or more wired or wireless network interfaces 703, one or more input/output interfaces 704, and/or one or more operating systems. Each part of the controller 700 may form an integral chip or a plurality of independent chips.

The procedure performed by the central processing unit 701 in the controller 700 in the embodiment is similar to the method procedure described in the embodiment shown in FIG. 2 or FIG. 3. Details are not described herein again. An embodiment of this application further provides a computer storage medium, configured to store computer program instructions used for the foregoing controller. The computer storage medium includes a program designed for the controller.

An embodiment of this application further provides a computer program product, including a computer program instruction. The computer program instruction may be loaded by using a processor to implement the method procedures in the embodiment shown in FIG. 2 or FIG. 3.

The foregoing is merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof. In addition, the modifications and replacements do not make the essence of the corresponding technical solutions depart from the scope of the technical solutions of the embodiments of this application.

What is claimed is:

1. A configuration method, comprising:

obtaining, by a controller, a first link profile corresponding to a first network device of a first site and a second link profile corresponding to a second network device of a second site from a profile library, wherein the profile library comprises a plurality of link profiles, wherein each of the plurality of link profiles is a profile comprises information corresponding to at least one link and the information comprises a link type, a link name, and a wide area network side physical port number of a gateway;

obtaining, by the controller, an address pool;

generating, by the controller, a first link configuration parameter corresponding to the first network device and a second link configuration parameter corresponding to the second network device based on the address pool, the first link profile, the second link profile and a link configuration rule, the link configuration rule comprising link name matching;

sending, by the controller, the first link configuration parameter to the first network device; and sending, by the controller, the second link configuration parameter to the second network device, wherein, when the link configuration rule comprises the link name matching the generating, by the controller, a first link configuration parameter corresponding to the first network device and a second link configuration parameter corresponding to the second network device based on the address pool, the first link profile, the second link profile and a link configuration rule, comprises:

determining, by the controller, whether there are two links having a same link name in the first link profile and the second link profile, and configuring, by the controller, a first link in the first link profile and a second link in the second link profile as a logical link.

2. The configuration method according to claim 1, wherein the link type includes internet, multiprotocol label switching (MPLS), or long term evolution (LTE).

3. The configuration method according to claim 1, wherein a link type includes multiprotocol label switching (MPLS).

4. The configuration method according to claim 1, further comprising:

obtaining, by the controller, a public IP address of a hub site if the first site or the second site is a hub site.

5. The configuration method according to claim 1, wherein a first network device of the first site serves as a first gateway of the first site to communicate with a second network device of the second site, wherein the second network device serves as a second gateway of the second site to communicate with the first network device.

6. The configuration method according to claim 1, further comprising establishing, by the controller, a tunnel between the first network device of the first site and the second network device of the second site.

7. The configuration method according to claim 1, the first site is a spoke site, the second site is a hub site.

8. A controller, comprising:

a processor;

a memory, configured to store program instructions; and which, when executed by the processor, cause the controller to:

obtain a first link profile corresponding to a first network device of a first site and a second link profile corresponding to a second network device of a second site from a profile library, wherein the profile library comprises a plurality of link profiles, wherein each of the plurality of link profiles is a profile comprises information corresponding to at least one link and the information comprises a link type, a link name, and a wide area network side physical port number of a gateway;

obtain an address pool;

generate a first link configuration parameter corresponding to the first network device and a second link configuration parameter corresponding to the second network device based on the address pool, the first link profile, the second link profile and a link configuration rule, the link configuration rule comprising link name matching;

send the first link configuration parameter to the first network device; and send the second link configuration parameter to the second network device, wherein, when the link configuration rule comprises the link name matching, the generate a first link configuration parameter corresponding to the first network device and a second link configuration parameter corresponding to the second network device based on the address pool, the first link profile, the second link profile and a link configuration rule, comprises:

determine whether there are two links having a same link name in the first link profile and the second link profile, and configure a first link in the first link profile and a second link in the second link profile as a logical link.

9. The controller according to claim 8, wherein the link type includes internet, multiprotocol label switching (MPLS), or long term evolution (LTE).

10. The controller according to claim 8, wherein the link type includes multiprotocol label switching (MPLS).

11. The controller according to claim 8, wherein the program instructions further cause the controller to:

obtain a public IP address of a hub site if the first site or the second site is a hub site.

12. The controller according to claim 8, wherein a first network device of the first site serves as a first gateway of the first site to communicate with a second network device of the second site, wherein the second network device serves as a second gateway of the second site to communicate with the first network device.

13. The controller according to claim 8, wherein the program instructions further cause the controller to: establish a tunnel between the first network device of the first site and the second network device of the second site.

14. The controller according to claim 8, the first site is a spoke site, the second site is a hub site.

15. A configuration method, comprising:

receiving, by a first network device of a first site, a first link configuration parameter from a controller;

wherein the first link configuration parameter is generated based on an address pool, a first link profile, a second link profile and a link configuration rule, the link configuration rule comprising link name matching;

wherein the first link profile corresponding to the first network device, the second link profile corresponding to a second network device of a second site;

wherein the first link profile and the second link profile from a profile library, wherein the profile library comprises a plurality of link profiles, wherein each of the plurality of link profiles is a profile comprises information corresponding to at least one link and the information comprises a link type, a link name, and a wide area network side physical port number of a gateway;

establishing a tunnel between the first network device and the second network device, wherein when there are two links having a same link name in the first link profile and the second link profile, a first link and a second link are configured as a logical link.

16. The configuration method according to claim 15, wherein the link type includes internet, multiprotocol label switching (MPLS), or long term evolution (LTE).

17. The configuration method according to claim 15, wherein a first network device of the first site serves as a first gateway of the first site to communicate with a second network device of the second site, wherein the second network device serves as a second gateway of the second site to communicate with the first network device.

18. The configuration method according to claim 15, the first site is a spoke site, the second site is a hub site.

19. A first network device of a first site, comprising:

a processor;

a memory, configured to store a program instruction; and which, when executed by the processor, cause the first network device to:

receive a first link configuration parameter from a controller, wherein the first link configuration parameter is generated based on an address pool, a first link profile, a second link profile and a link configuration rule, the link configuration rule comprising link name matching, wherein the first link profile corresponding to the first network device, the second link profile corresponding to a second network device of a second site from a profile library, wherein the profile library comprises a plurality of link profiles, wherein each of the plurality of link profiles is a profile comprises information corresponding to at least one link and the information comprises a link type, a link name, and a wide area network side physical port number of a gateway; and establish a tunnel between the first network device and the second network device, wherein when there are two links having a same link name in the first link profile and the second link profile, a first link and a second link are configured as a logical link.

20. The first network device according to claim 19, wherein the link type includes internet, multiprotocol label switching (MPLS), or long term evolution LTE).

21. The first network device according to claim 19, wherein a first network device of the first site serves as a first gateway of the first site to communicate with a second network device of the second site, wherein the second network device serves as a second gateway of the second site to communicate with the first network device.

22. The first network device according to claim 15, the first site is a spoke site, the second site is a hub site.

* * * * *